(12) United States Patent
Iorio

(10) Patent No.: US 8,078,658 B2
(45) Date of Patent: *Dec. 13, 2011

(54) ASCII TO BINARY DECIMAL INTEGER CONVERSION IN A VECTOR PROCESSOR

(75) Inventor: Francesco Iorio, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 930 days.

This patent is subject to a terminal disclaimer.

(21) Appl. No.: 12/024,863

(22) Filed: Feb. 1, 2008

(65) Prior Publication Data
US 2009/0198752 A1   Aug. 6, 2009

(51) Int. Cl.
*G06F 5/00* (2006.01)
(52) U.S. Cl. ........................................ 708/204
(58) Field of Classification Search ........... 708/200–209
See application file for complete search history.

(56) References Cited

U.S. PATENT DOCUMENTS

| | | | | |
|---|---|---|---|---|
| 3,872,442 A * | 3/1975 | Boles et al. | ................... | 708/204 |
| 4,068,298 A | 1/1978 | Dechant et al. | | |
| 4,433,327 A * | 2/1984 | Vallet et al. | .................... | 708/204 |
| 4,437,156 A * | 3/1984 | Christopher et al. | ......... | 708/139 |
| 4,672,360 A | 6/1987 | Bradley et al. | | |
| 5,335,267 A | 8/1994 | Evers et al. | | |
| 5,600,584 A * | 2/1997 | Schlafly | ........................ | 708/551 |
| 5,657,259 A * | 8/1997 | Davis et al. | ................... | 708/204 |
| 5,796,641 A * | 8/1998 | Tu | ................... | 708/204 |
| 6,633,242 B2 | 10/2003 | Brown | | |
| 7,088,804 B1 | 8/2006 | Kasturi et al. | | |
| 7,797,360 B2 * | 9/2010 | Kretzschmar et al. | ......... | 708/204 |
| 2008/0001790 A1 * | 1/2008 | Kirby et al. | ..................... | 341/50 |
| 2008/0018507 A1 * | 1/2008 | Maluf et al. | .................... | 341/55 |

FOREIGN PATENT DOCUMENTS

| JP | 2007058554 | 11/1993 |
|---|---|---|
| JP | 5289845 | 3/2007 |

* cited by examiner

*Primary Examiner* — David H Malzahn
(74) *Attorney, Agent, or Firm* — PRTSI, Inc.; Martin D. Moynihan

(57) ABSTRACT

A system, method, and apparatus for the constant time, branchless conversion of decimal integers of varying size in ASCII format to a decimal integer in binary decimal format in a vector processor utilizing simultaneous conversion of the string to a binary format, followed by simultaneous multiplications of the binary result by appropriate powers of ten and a fixed number of steps of vector addition, followed by a final step of a scalar multiplication of a sign value.

1 Claim, 1 Drawing Sheet

ASCII TO BINARY DECIMAL INTEGER CONVERSION IN A VECTOR PROCESSOR

The present invention relates to the conversion of numerical data in a vector processor.

BACKGROUND

One of a processor's functions is to perform arithmetic operations on numerical data. When the input data for these operations are integers in the American Standard Code for Information Interchange (ASCII) format, a conversion to a binary decimal format is often performed. This is desirable from a space and time efficiency point of view, since, in the ASCII format, each number, zero to nine that, together, comprise the integer, is represented by eight bits (seven bits for the number representation and one bit for parity). Thus, eight bits would be able to represent an integer of zero to one hundred twenty seven plus a sign bit in a binary decimal format, but only an integer of zero to nine in an ASCII format; sixteen bits would be able to represent an integer from zero to thirty two thousand seven hundred sixty seven plus a sign bit, but only an integer from zero to ninety nine in the ASCII format; and n bits (where n equals an integer greater than zero) would be able to represent an integer from zero to (two to the power of (n plus one)) minus one, but only an integer from zero to nine for n equals one, zero to ninety nine for n equals two, zero to nine hundred ninety nine for n equals three, etc.

Methods for conversion from ASCII to binary decimal within a processor are known. These methods include identifying the beginning, ending, and sign of the integer ASCII string followed by taking each of the seven bit components of the integer one at a time, usually starting with the least significant digit and subtracting the binary number forty eight to get the decimal numbers that make up the integer. Then each of the decimal components of the integer are multiplied by a power of ten, starting with ten to the zero power, or 1, for the least significant digit, ten to the first power, or 10, for the digit to the left of the least significant digit, if applicable, ten to the second power, or 100, for the digit to the left of the previous digit, if applicable, etc. This is repeated for as many digits comprising the integer, up to and including the most significant digit. Each of these products is then aggregated and the sign added, resulting in the converted number.

One problem with this technique is that the time for conversion will vary, becoming longer as the size of the ASCII integer string increases. Another problem with the prior art is that the code for performing the conversion function involves branching in the instruction stream, also adding to the execution time and efficiency of the conversion.

SUMMARY

To overcome the problems described above, it is an object of this invention to provide a vector processor architecture and method for converting a signed ASCII integer, of any size, to a signed binary decimal integer in the vector processor wherein the conversion time will be constant regardless of the ASCII integer size.

It is a further object of the invention to provide a vector processor architecture, selection of code, and a method for converting a signed ASCII integer to a signed binary decimal integer, within the vector processor which utilizes a fixed sequence of instructions, comprising a constant number of instructions, that do not depend on the size of the ASCII representation, without performing branches in the instruction stream.

While the conversion technique does not impose, upon the process of conversion, the use of a single instruction, it is yet a further objective of the invention to provide a vector processor capable of the conversion using a single instruction.

To achieve the objective of a constant time conversion, the system and method includes breaking the integer up into two or more sections and loading each section into one or more fixed sized registers, the number and lengths of said registers designed so as to accommodate the largest string length expected, subtracting binary forty eight from each character of the integer string and multiplying the resultant number by an appropriate power of ten, where the operations of subtracting binary forty eight from each of the ASCII integer's digits and multiplying by the appropriate power of ten are done in parallel and then aggregating the parallel results.

To achieve the objective of a single instruction conversion without branching, the conversion is performed using a fixed sequence of a constant number of instructions without the need for branching.

To achieve the additional objective of providing a vector processor capable of performing the conversion with a single instruction, the inherent Single Instruction Multiple Data (SIMD) capability of the vector processor is used in combination with code designed with the SIMD function in the design the vector processor.

DETAILED DESCRIPTION OF THE INVENTION

Figure 1:
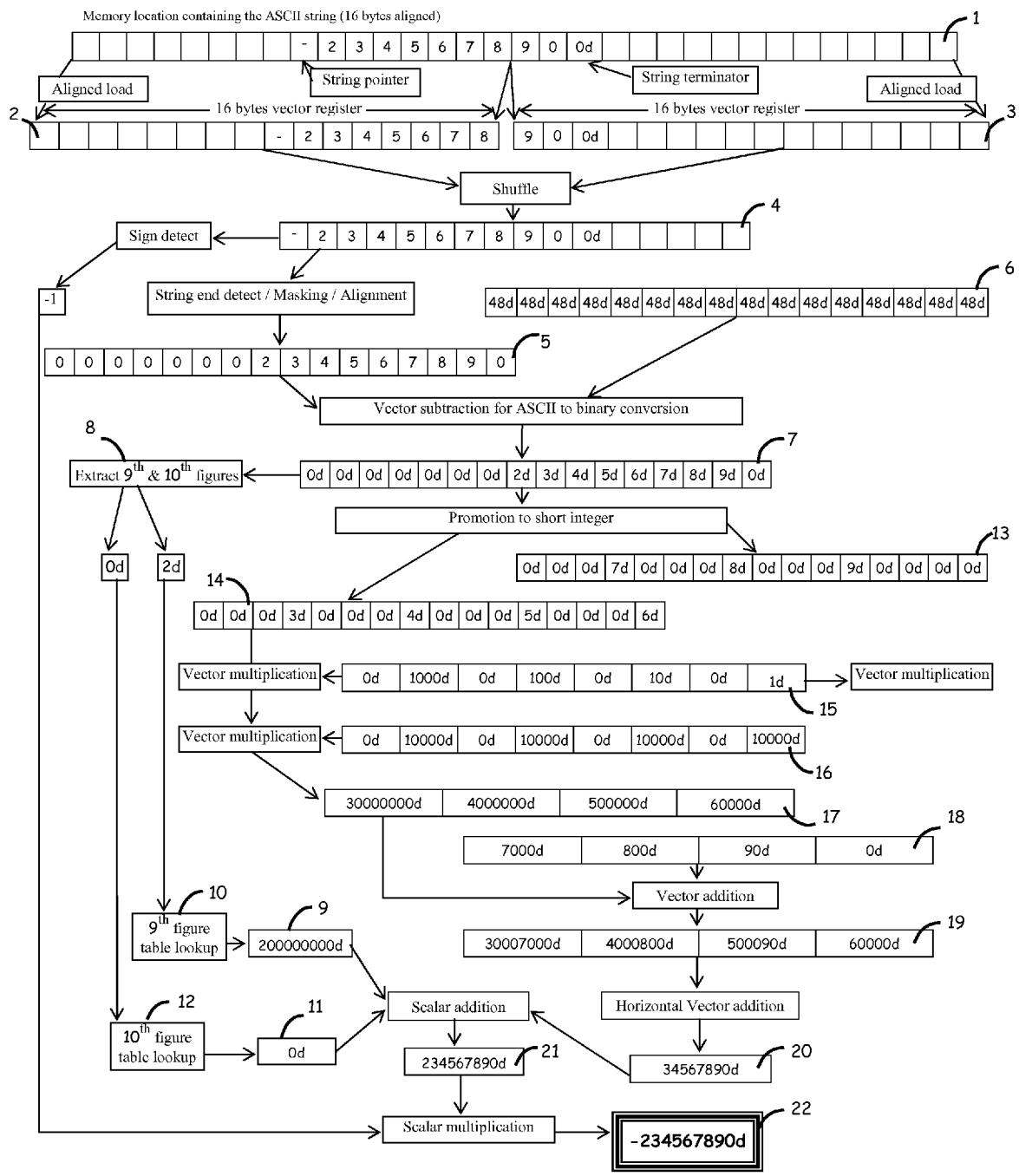
FIG. 1. A flow of the ASCII to Binary Decimal integer conversions in a vector processor.

FIG. 1 represents a flow of a preferred embodiment of the invention. It shows steps and registers involved in a branchless, constant time execution of an ASCII integer to binary decimal conversion within the vector processor. The ASCII integer value can be any value equal to, less than or greater than zero and comprising any number of digits, less than or equal to 10.

In the example of FIG. 1, the integer is less than zero, therefore a negative number, whose absolute value is 234567890. Thus the number in the example is comprised of 9 digits plus a sign (in this case negative) and ends in a string terminator.

FIG. 1 illustrates the steps that are performed by the system, comprising a vector processor, access to a memory (32 bytes of which is shown), a plurality of registers, a routine comprising a set of instructions and means to perform operations on the data fetched from memory and to store the results within and transfer the results between data registers.

In step 1, the system executes an instruction for ASCII to binary decimal conversion which begins by fetching the ASCII number within a 32 byte memory word, 1, from the memory and detecting the beginning and end of the integer. In this embodiment the integer is contained in the 32 byte memory word, which is not aligned with a word boundary of the vector processor's registers. The system detects the integer as being between the sign bit and the string terminator.

In step 2, the routine aligns the loaded word's first byte with the first byte of a first 16 byte vector register, 2, and aligns the word's last byte with the last byte of a second 16 byte vector register, 3, and places a first portion of the ASCII string in 2 and a second portion in 3.

In step 3, the routine shuffles the contents of the first and second registers into a third 16 byte register, 4, such that the left most byte contains the sign and the following bytes to the right contain the integer digits.

In step 4, the routine detects the sign, stores and strips the sign from the word, detects the string end, and shifts the remaining digits of the integer to a right justified aligned position in a fourth register, 5. The routine, in parallel with the sign detection, masks unused leading characters as zeros in the fourth register, 5.

In step 5, the routine subtracts a binary decimal forty eight, contained in a fifth register, 6, from each character of the word in the register of step 4 to perform the ASCII to binary conversion of each digit of the integer. The routine then places the results of the subtraction in a sixth register, 7.

In step 6, counting from the right to the left in the sixth register, the routine performs an extraction, 8, of the digits to the left of the eighth byte (in this embodiment, the ninth and tenth characters), performs a multiplication of a power of ten, 9, to the ninth character from a first table lookup operation, 10, and performs a multiplication of a power often, 11, to the tenth character from a second table lookup operation, 12.

In steps 7a and 7b, the routine promotes the now eight byte integer word into two short integer words and stores the results in a sixth register, 13, and seventh register, 14.

In steps 8a through 8d, the routine applies vector multiplication to each digit of the two short integers by an appropriate power of ten, residing in an eighth register, 15, and ninth register, 16, corresponding to each digit's placement inside the decimal number and places the results in a tenth register, 17, and eleventh register, 18.

In step 9, the routine performs vector addition on the resultant bytes of steps 8a through d, which were stored in 17 and 18, and stores the results in a twelfth register, 19.

In step 10, the routine horizontally adds the results in 19 and stores the result in a thirteenth register, 20.

In steps 11, the routine performs a scalar addition on the results, 9 and 11 from step 6 and step 10 and stores the result in a fourteenth register, 21.

In step 12, the routine performs a scalar multiplication of the sign stored from step 4 and the result, 21, from step 11 and stores this, the final result in a fifteenth register, 22.

While the embodiment of FIG. 1 shows an example of the execution of the integer format conversion in a vector processor using an ASCII string of 10 or fewer digits, the technique can be extended to support any number of digits, greater than 10, by hierarchical combination of the same process over multiple sections of the ASCII string, still giving a constant, albeit longer, time of conversion.

As stated above, the ASCII integer size may vary, but through the application of the parallel arithmetic means and operations and by adjusting the number and lengths of the registers and/or the word sizes, the execution time of the conversion will remain constant and the conversion will be performed without branching.

What is claimed:

1. An algorithmic method to perform branchless constant-time ASCII string integer to decimal binary format conversion on vector processors, regardless of the size of the ASCII string integer, said ASCII string integer comprising a sign, one or more digits, and a string terminator and said method comprising:

execution of the conversion, using code comprising a fixed sequence of a constant number of instructions stored in the processor; further comprising the steps of:

breaking the ASCII string integer up into two or more sections and loading each section into one or more fixed sized vector registers, the number and lengths of said registers designed to accommodate the largest string length expected;

simultaneously detecting, shifting and masking wherein the ASCII string integer'sign, and string terminator are detected, the sign is stripped and stored, and the remaining digits of the integer contained in all the sections are shifted into a right justified aligned position in a single vector processor register while masking all unused leading character positions of the vector processor register as zeros;

simultaneously subtracting binary forty eight from each character of the ASCII integer string performing a conversion of all characters of the string into corresponding binary values;

simultaneously multiplying each of the binary values by a power of 10 corresponding to where the decimal binary values are placed relative to each other; and aggregation of results of the multiplications and scalar multiplication of the aggregation by the stored sign into a final signed decimal binary result.

* * * * *